United States Patent
Ickin

(10) Patent No.: US 11,089,367 B2
(45) Date of Patent: Aug. 10, 2021

(54) CONTROLLING PLAY OUT OF ADVERTISEMENT CONTENT DURING LIVE VIDEO STREAMING AT AN END-USER TERMINAL

(71) Applicant: Telefonaktiebolaget LM Ericsson (publ), Stockholm (SE)

(72) Inventor: Selim Ickin, Stocksund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/954,242

(22) PCT Filed: Dec. 18, 2017

(86) PCT No.: PCT/EP2017/083268
§ 371 (c)(1),
(2) Date: Jun. 16, 2020

(87) PCT Pub. No.: WO2019/120471
PCT Pub. Date: Jun. 27, 2019

(65) Prior Publication Data
US 2020/0413139 A1 Dec. 31, 2020

(51) Int. Cl.
*H04N 21/458* (2011.01)
*G06Q 30/02* (2012.01)
(Continued)

(52) U.S. Cl.
CPC ....... *H04N 21/458* (2013.01); *G06Q 30/0254* (2013.01); *H04N 21/2187* (2013.01);
(Continued)

(58) Field of Classification Search
CPC ............. H04N 21/458; H04N 21/2187; H04N 21/433; H04N 21/4394; H04N 21/44008;
(Continued)

(56) References Cited

U.S. PATENT DOCUMENTS

2010/0281497 A1* 11/2010 Miyazaki ......... H04N 21/44218
725/14
2020/0107055 A1* 4/2020 Grant ................. H04N 21/8455

FOREIGN PATENT DOCUMENTS

| JP | 2017188841 A | * 10/2017 | ........... H04N 21/262 |
| WO | 2017 175482 A1 | 10/2017 | |
| WO | 2018 086713 A1 | 5/2018 | |

OTHER PUBLICATIONS

A Beginner's Guide to Recurrent Networks and LSTMs, Deep Learning Textbook—Copyright 2017.
(Continued)

*Primary Examiner* — Alexander Gee
(74) *Attorney, Agent, or Firm* — Baker Botts, LLP

(57) ABSTRACT

A method (100) of controlling playout of advertisement content during live video streaming at an end-user terminal comprising steps of: receiving (110) advertisement content from an advertisement server; receiving (112) live streamed video content from a content delivery network and playing out the video content; obtaining (114) at least one of image features and audio features of the video content during playout; calculating (116) a content importance rating of video content to be played out during a prediction time window based on said features; and postponing (118) playout of advertisement content scheduled to be played out during the prediction time window if the calculated content importance rating for the prediction time window is above a threshold value.

12 Claims, 7 Drawing Sheets

(51) Int. Cl.
  *H04N 21/2187* (2011.01)
  *H04N 21/433* (2011.01)
  *H04N 21/439* (2011.01)
  *H04N 21/44* (2011.01)
  *H04N 21/442* (2011.01)
  *H04N 21/81* (2011.01)
  *H04N 21/845* (2011.01)

(52) U.S. Cl.
  CPC ..... *H04N 21/4331* (2013.01); *H04N 21/4394* (2013.01); *H04N 21/442* (2013.01); *H04N 21/44008* (2013.01); *H04N 21/44016* (2013.01); *H04N 21/812* (2013.01); *H04N 21/8456* (2013.01)

(58) Field of Classification Search
  CPC ........... H04N 21/44016; H04N 21/442; H04N 21/812; H04N 21/8456; G06Q 30/0254
  See application file for complete search history.

(56) References Cited

OTHER PUBLICATIONS

Best Practices for OTT Dynamic Ad Insertion, Google Cloud Platform, Anvato—2020.
Mel Frequency Cepstral Coefficients (MFCC) Based Speaker Identification in Noisy Environment Using Wiener Filter by Paresh M. Chauhan an Nikita P. Desai; IEEE International Conference—2014.
PCT Notification of Transmittal of the International Search Report and the Written Opinion of the International Searching Authority, or the Declaration issued for International application No. PCT/EP2017/083268—dated Jul. 12, 2018.
Semantic Video Analysis for Adaptive Content Delivery and Automatic Description, IEEE Transactions on Circuits and Systems for Video Technology (to appear) by Andrea Cavallaro et al.—Nov. 2005.

* cited by examiner

CONTROLLING PLAY OUT OF ADVERTISEMENT CONTENT DURING LIVE VIDEO STREAMING AT AN END-USER TERMINAL

PRIORITY

This nonprovisional application is a U.S. National Stage Filing under 35 U.S.C. § 371 of International Patent Application Serial No. PCT/EP2017/083268 filed Dec. 18, 2017 and entitled "Controlling Playout Of Advertisement Content During Live Video Streaming At An End-User Terminal' which is hereby incorporated by reference in its entirety.

TECHNICAL FIELD

The invention relates to a method of controlling playout of advertisement content during live video streaming at an end-user terminal. The invention also relates to an end-user terminal.

BACKGROUND

Playout of advertisements during video streaming can be done in different ways, including just in time downloading or pre-fetching before the video stream starts. The placement and the location of the advertisements are typically defined by video service providers, manually. The video starts the play out and then the advertisements are typically downloaded and are injected to pre-defined locations of the video during video streaming. The choice of advertisement content and the location are done often based on algorithms to maximize the probability of the service provider targeting high hit rates of the advertisement content. The goal for the ad-insertion is to maximize the relevant advertisements presented to the end users to maximize profit. In parallel, ad-insertion needs to be done carefully such that it will not annoy the user in any way including the wrong content, wrong timing and wrong placement. Therefore, the procedure of advertisement placement is typically planned very carefully.

In live (near real time) video streaming, the video content is broadcast to user terminals and is watched by a user as the content is generated in near real time. Examples of live video streaming include live news and live sports events. Live streamed video content is often not re-playable, to minimize end-to-end latency of the broadcast video content. If a user misses some video content, due to a distortion in the network, it can negatively impact on the quality of experience, QoE, of the user. Thus, there is often no long buffering used in live video streaming, and late arriving video content packets are simply skipped by the video player; the video stream continues with the most up to date video content when the network quality allows. This is especially important in, for example, live streaming of important news or live sports events.

Advertisement locations in time (referred to as 'markers') are predefined before the start of the video streaming. Advertisement markers and the corresponding advertisement content links are known by the video player during a video stream, and when the time for the advertisement content to be played out comes, the advertisement content completely replaces the video content, as described, for example, in the Google Cloud platform white paper "Best practices for OTT (over the top) dynamic ad insertion". In other words, the presentation of the video content is preferably not delayed, but is rather skipped, as illustrated in FIG. 1. In live streaming, the timing of advertisement playout is therefore critical due to the risk of losing the original video content and, for example, missing a goal in an important match.

A typical ad-insertion procedure is as follows: a video player is created and information regarding the chosen video content is fetched to the video player, including advertisement source links and information on when each advertisement content should be displayed; a manifest file is created containing the available bitrates of the video server and the link to the available CDN's; video segments are downloaded from the CDN to the playback buffer of the video player and then video playback starts; and the video player plays out the video content and, when an advertisement marker is reached, the advertisement content is downloaded, using a link for the advertisement provided to the video player along with the video source information in the manifest file, and then played out by the video player.

Advertisement placement has been a challenge for service providers; they have to target both the right users with content relevant to the user, to be shown at the right time, and the advertisements are required to be watched and populated to as many users as possible. Both these requirements need to be met simultaneously, without impacting one another. If advertisement is not shown at the right time, during a video stream, the advertisement might not be as effective as it had been originally planned. In addition, display of advertisements should not negatively impact end user QoE.

SUMMARY

It is an object to provide an improved method of controlling playout of advertisement content during live video streaming at an end-user terminal. It is a further object to provide an improved end-user terminal.

An aspect of the invention provides a method of controlling playout of advertisement content during live video streaming at an end-user terminal. The method comprises steps of: receiving advertisement content from an advertisement server; receiving live streamed video content from a content delivery network and playing out the video content; obtaining at least one of image features and audio features of the video content during playout; calculating a content importance rating of video content to be played out during a prediction time window based on said features; and postponing playout of advertisement content scheduled to be played out during the prediction time window if the calculated content importance rating for the prediction time window is above a threshold value.

Advantageously, the method enables advertisement playout to be done taking into consideration a video content importance rating during live streaming, indicative of the importance of the content to a user viewing the content, so that advertisement content will not be played out if a content importance rating of video content to played out during an upcoming time window is above a threshold value. The method may enable fine tuning of the location of advertisement content during live video streaming. This method may prevent a user missing content considered important to them during a live video streaming session while advertisement content is being played out on the end-user terminal. The method may therefore prevent negative impact on user QoE of advertisement content being played during live video streaming.

In an embodiment, the advertisement content is received by fetching the advertisement content from the advertisement server at the beginning of a live video streaming session, before the live streamed video content is received.

In an embodiment, a content importance rating is calculated for a prediction time window when a pre-set playout time for advertisement content is reached; the prediction time window follows the pre-set playout time. Advantageously, advertisement content playout may be postponed to a later time which is not too different from its original pre-set play out time. This may prevent a user missing important content during a live video streaming session while preserving the effectiveness of the advertisement content.

In an embodiment, obtaining image features comprises identifying objects within the video content and obtaining audio features comprises obtaining representations of power spectra of sounds within the video content. This may enable an important scene and/or important dialogue to be identified.

In an embodiment, calculating a content importance rating comprises analysing audio features of the video content to obtain Mel-frequency cestrum coefficients of the audio features. This may enable the content importance rating to take into account an importance of dialogue occurring within the video content.

In an embodiment, calculating a content importance rating comprises performing sentiment analysis on the audio features of the video content. This may enable the content importance rating to take into account characteristics of dialogue occurring within the video content, such as whether a discussion or an argument is occurring or whether the commentary on a sports match indicates that a team or player is about to score.

In an embodiment, the method further comprises obtaining additional features comprising at least one of a video frame rate, a video bit rate, a video contrast, a spatial complexity, a temporal complexity, a sound level, proximity of a user to the end-user terminal, number of running applications on the end-user terminal, and a current time of day. Predicting the content importance rating of video content is additionally based on the additional features. Obtaining and using additional features may improve the accuracy of the content importance rating that is calculated. Temporal complexity indicates how the main frame types are changing during the live video streaming. If there are very frequent changes, for instance during a soccer match or in similar sports events, including this feature may provide an indication of a high level of action in the displayed video content. A high video bitrate or frame rate in some portions of the video stream may also indicate a higher level of action in the video content. The number of running applications on the end-user terminal may enable the content importance rating to include an indication of whether the end-user terminal comprises a video streaming application running in the background or not. The proximity of a user to the end-user terminal may enable the content importance rating to include an indication whether a user is watching the live streaming video content.

In an embodiment, calculating the content importance rating comprises: determining a first criticality probability of the image features and applying a first weight to first criticality probability; determining second criticality probability of the audio features and applying a second weight to the second criticality probability; determining a third criticality probability of the additional features and applying a third weight to the third criticality probability; and summing the first, second and third weighted criticality probabilities. Different weightings may therefore be applied to the three criticality probabilities so that image features, audio features and additional features can be given different levels of importance in calculating the content importance rating depending upon the nature of the content. For example, video content may be given a greater weighting when live streaming sport whereas audio content may be given a greater weighting when live streaming a panel discussion or a concert.

In an embodiment the content importance rating is a binary rating, such as I/O or Yes/No. This may support simple decision making regarding whether or not to postpone advertisement content playout.

In an embodiment, the image features, audio features and additional features are obtained from video content within a measurement time window and the prediction time window follows the measurement time window. The measurement and prediction time windows are rolling time windows. This may enable a content importance rating to be calculated for a prediction time window that is close to the played-out section of the video content from which image features and/or audio features are obtained. This may also provide a more accurate content importance rating to be calculated for the prediction time window, as more relevant data will exist due to it being gathered close to the prediction time window.

An aspect of the invention provides an end-user terminal arranged to control playout of advertisement content during live video streaming. The end-user terminal comprises a receiver and a processor. The receiver arranged to receive advertisement content from an advertisement server, and to receive live streamed video content from a content delivery network. The receiver is also arranged to play out the video content and the advertisement content. The processor is arranged to obtain at least one of image features and audio features of the video content during playout. The processor is arranged to calculate a content importance rating of video content to be played out during a prediction time window based on said features. The processor is further arranged to postpone playout of advertisement content scheduled to be played out during the prediction time window if the calculated content importance rating for the prediction time window is above a threshold value.

Advantageously, the end-user terminal enables advertisement playout to be done taking into consideration video content importance during live streaming, so that advertisement content will not be played out if a content importance rating of video content to played out during an upcoming time window is above a threshold value. The end-user terminal may enable fine tuning of the location of advertisement content during live video streaming. The end-user terminal may prevent a user missing important content during a live video streaming session while advertisement content is being played out on the end-user terminal. The end-user terminal may therefore prevent negative impact on user QoE of advertisement content being played during live video streaming.

In an embodiment, the receiver is arranged to receive advertisement content by fetching the advertisement content from the advertisement server at the beginning of a live video streaming session, before the live streamed video content is received.

In an embodiment, the processor is arranged to determine, when a pre-set playout time for advertisement content is reached, whether the video content to be played out during a prediction time window following the pre-set playout time has a content importance rating above the threshold value. The processor is arranged to postpone playout of advertisement content if the video content to be played out during said prediction time window has a content importance rating that is above the threshold value. Advantageously, this may enable the user-terminal to postpone playout of advertisement content to a later time which is not too different from its original pre-set play out time. This may prevent a user missing important content during a live video streaming session while preserving the effectiveness of the advertisement content.

In an embodiment, the processor is arranged to obtain image features by identifying objects within the video content and is arranged to obtain audio features by obtaining representations of power spectra of sounds within the video content. This may enable an important scene and/or important dialogue to be identified.

In an embodiment, the processor is arranged to calculate a content importance rating by analysing audio features of the video content to obtain Mel-frequency cestrum coefficients of the audio features. This may enable the content importance rating to take into account an importance of dialogue occurring within the video content.

In an embodiment, the processor is arranged to calculate a content importance rating by performing sentiment analysis on the audio features of the video content. This may enable the content importance rating to take into account characteristics of dialogue occurring within the video content, such as whether a discussion or an argument is occurring.

In an embodiment, the processor is arranged to obtain additional features comprising at least one of a video frame rate, a video bit rate, a video contrast, a spatial complexity, a temporal complexity, a sound level, proximity of a user to the end-user terminal, number of running applications on the end-user terminal, and a current time of day. The processor is arranged to calculate the content importance rating additionally based on the additional features. Obtaining and using additional features may improve the accuracy of the content importance rating that is calculated. Temporal complexity indicates how the main frame types are changing during the live video streaming. If there are very frequent changes, for instance during a soccer match or in similar sports events, including this feature may provide an indication of a high level of action in the displayed video content. A high video bitrate or frame rate in some portions of the video stream may also indicate a higher level of action in the video content. The number of running applications on the end-user terminal may enable the content importance rating to include an indication of whether the end-user terminal comprises a video streaming application running in the background or not. The proximity of a user to the end-user terminal may enable the content importance rating to include an indication whether a user is watching the live streaming video content.

In an embodiment, the processor is arranged to predict the content importance rating by: determining a first criticality probability of the image features and applying a first weight to first criticality probability; determining second criticality probability of the audio features and applying a second weight to the second criticality probability; determining a third criticality probability of the additional features and applying a third weight to the third criticality probability; and summing the first, second and third weighted criticality probabilities. Different weightings may therefore be applied to the three criticality probabilities so that image features, audio features and additional features can be given different levels of importance in calculating the content importance rating depending upon the nature of the content. For example, video content may be given a greater weighting when live streaming sport whereas audio content may be given a greater weighting when live streaming a panel discussion or a concert.

In an embodiment the content importance rating is a binary rating, such as I/O or Yes/No. This may support simple decision making by the processor regarding whether or not to postpone advertisement content playout.

In an embodiment, the processor is arranged to obtain the image features, audio features and additional features from video content within a measurement time window. The processor is arranged to predict a content importance rating of video content to be played out during a prediction time window following the measurement time window. The measurement and prediction time windows are rolling time windows. This may enable a content importance rating to be calculated for a prediction time window that is close to the played-out section of the video content from which image features and/or audio features are obtained. This may also provide a more accurate content importance rating to be calculated for the prediction time window, as more relevant data will exist due to it being gathered close to the prediction time window.

An aspect of the invention provides an end-user terminal comprising advertisement content processing circuitry, playback buffer processing circuitry, video player processing circuitry and prediction processing circuitry. The advertisement content processing circuitry is arranged to receive advertisement content from an advertisement server. The playback buffer processing circuitry is arranged to receive video content from a content delivery network. The video player processing circuitry is arranged to playout video content from the playback buffer and advertisement content from the advertisement content processing circuitry. The video player processing circuitry is arranged to obtain at least one of image features and audio features of the video content during playout. The prediction processing circuitry is arranged to predict a content importance rating of video content to be played out during a prediction time window based on said features. Wherein the video player processing circuitry is arranged to postpone playout of advertisement content scheduled to be played out during the prediction time window if the calculated content importance rating for the prediction time window is above a threshold value.

An aspect of the invention provides a computer program, comprising instructions which, when executed on at least one processor, cause the at least one processor to carry out any of the above steps of the method of controlling playout of advertisement content during live video streaming at an end-user terminal.

An aspect of the invention provides a data carrier having computer readable instructions embodied therein. The said computer readable instructions are for providing access to resources available on a processor. The computer readable instructions comprise instructions to cause the processor to perform any of the above steps of the method of controlling playout of advertisement content during live video streaming at an end-user terminal.

In an embodiment, the data carrier is a non-transitory data carrier.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

Embodiments of the invention will now be described, by way of example only, with reference to the accompanying drawings.

DETAILED DESCRIPTION

The same reference numbers will used for corresponding features in different embodiments.

Figure 1:
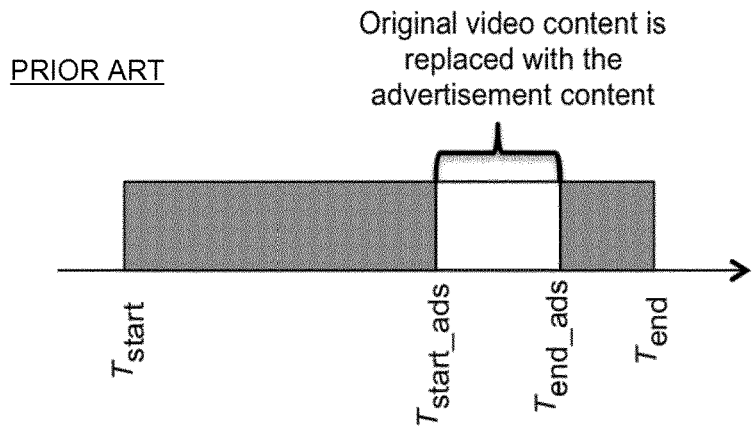
FIG. 1 illustrates prior art replacement of original video content with advertisement content during live video streaming.
Figure 2:
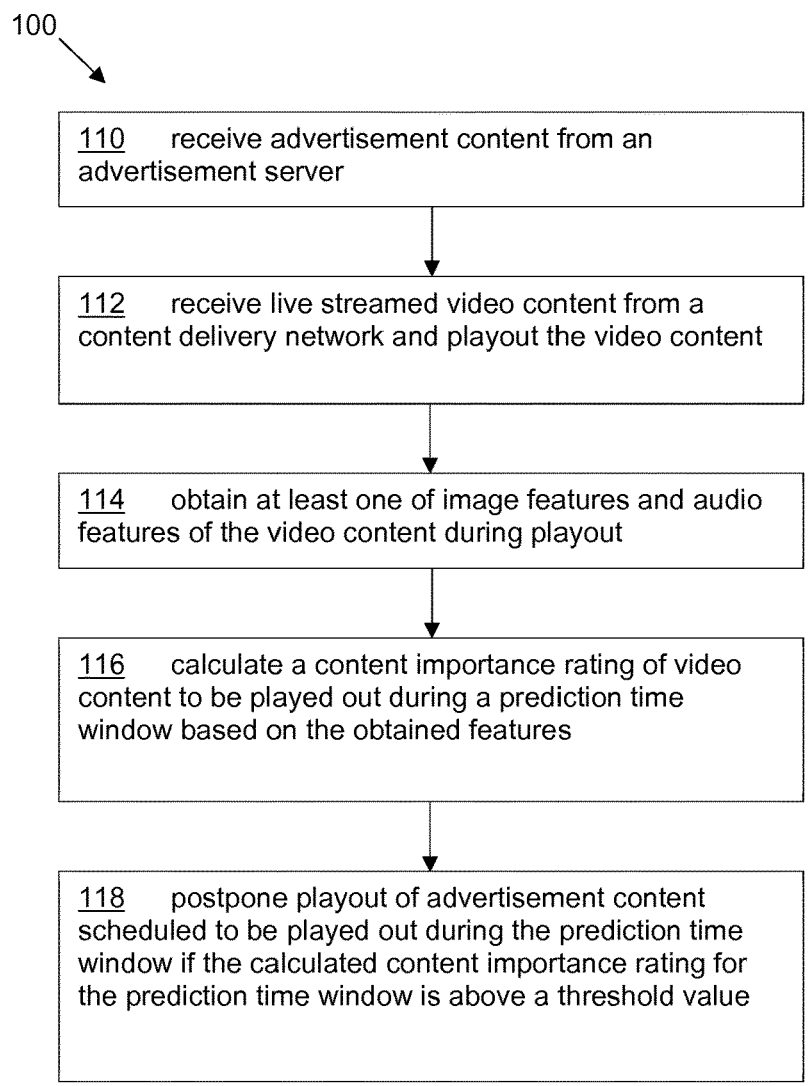
FIGS. 2 to 8 illustrate methods of controlling playout of advertisement content during live video streaming at an end-user terminal according to embodiments of the invention.

Referring to FIG. 2, an embodiment of the invention provides a method 100 of controlling playout of advertisement content during live video streaming at an end-user terminal. The method comprises steps of:

receiving 110 advertisement content from an advertisement server;

receiving 112 live streamed video content from a content delivery network and playing out the video content;

obtaining 114 at least one of image features and audio features of the video content during playout;

calculating 116 a content importance rating of video content to be played out during a prediction time window based on said features; and postponing 118 playout of advertisement content scheduled to be played out during the prediction time window if the calculated content importance rating for the prediction time window is above a threshold value.

In an embodiment, the end-user terminal is a video player on a mobile device, such as a smartphone or a tablet.

Pre-fetching advertisement content at the beginning of live video streaming is preferred to just-in-time, JIT, downloading of advertisement content. Since advertisement content is often not long, pre-fetching is not expected to impact network requirements significantly.

An embodiment of the invention therefore provides a method of controlling playout of advertisement content during live video streaming at an end-user terminal comprising: downloading the (as predefined by a service provider) advertisement content in advance, before live video streaming starts; calculating a real time content importance rating of the video content that the user is watching; and if advertisement content has be scheduled to playout during the presentation of important content, postponing the advertisement playout slightly, to a later time which is not too different from its original location. The method may therefore advantageously avoid replacement of important/critical live information/video content with advertisement content.

Figure 3:
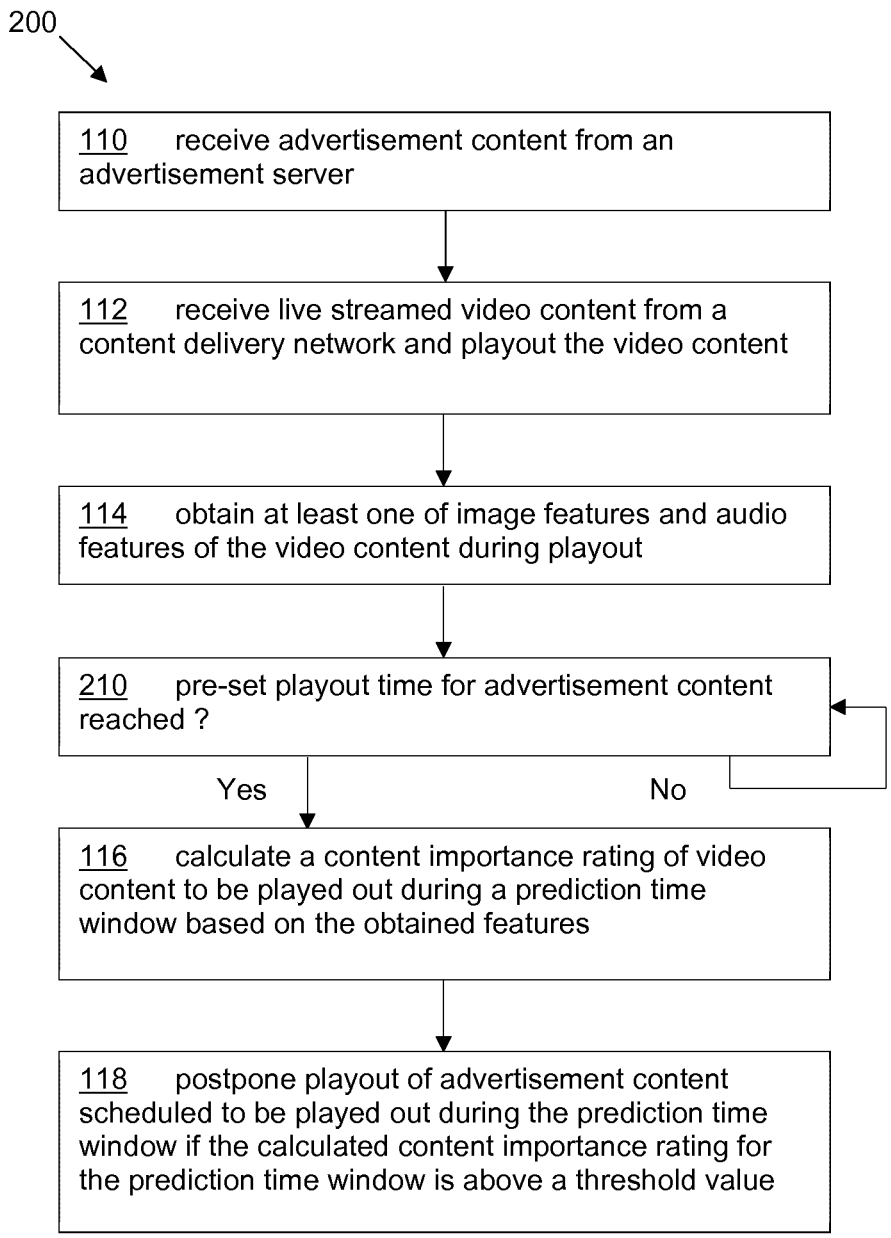

In an embodiment, as illustrated in FIG. 3, when a pre-set playout time for advertisement content is reached 210, a content importance rating is calculated for a prediction time window following the pre-set playout time.

Figure 4:
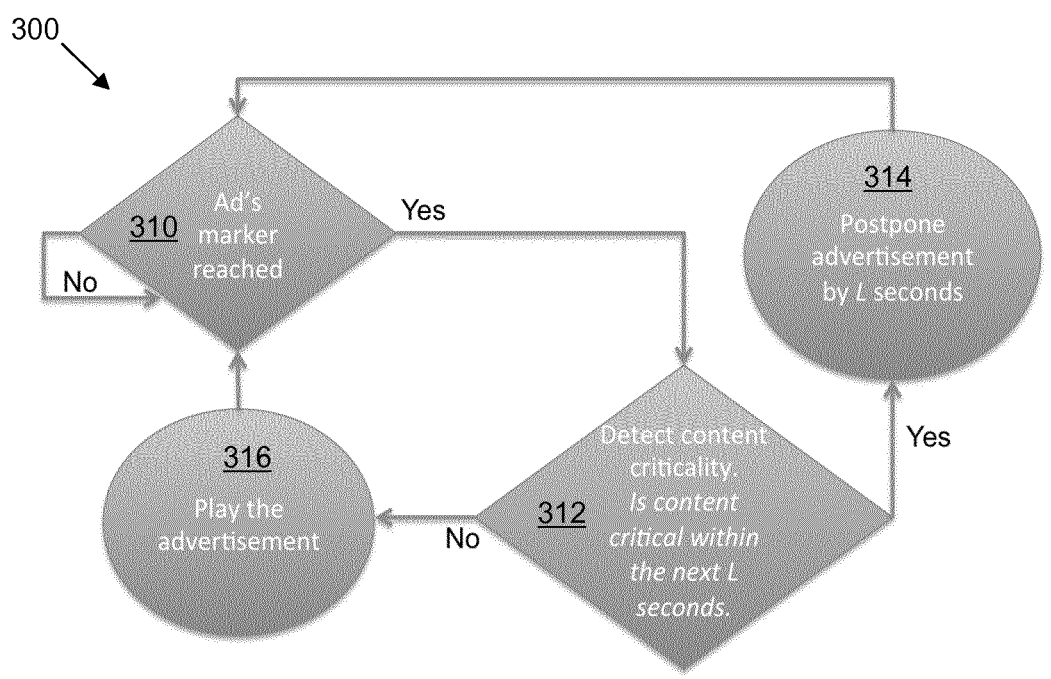

A pre-set playout time for advertisement content is typically indicated by an advertisement marker. In the method 300 of the embodiment illustrated in FIG. 4, when an advertisement marker is reached 310 an assessment 312 is made as to whether the video content is critical within a prediction time window that is L seconds long, i.e. is the content critical within the next L seconds? Video content is considered to be critical if the calculated content importance rating is above a threshold value. If the content is critical, playout of the advertisement content is postponed 314 by L seconds. If the content is not critical, the advertisement content is played out 316.

In an embodiment, obtaining image features comprises identifying objects within the video content and obtaining audio features comprises obtaining representations of power spectra of sounds within the video content.

Calculating the content importance rating may include analysing audio features of the video content to obtain Mel-frequency cestrum coefficients of the audio features or may include performing sentiment analysis on the audio features.

Figure 5:
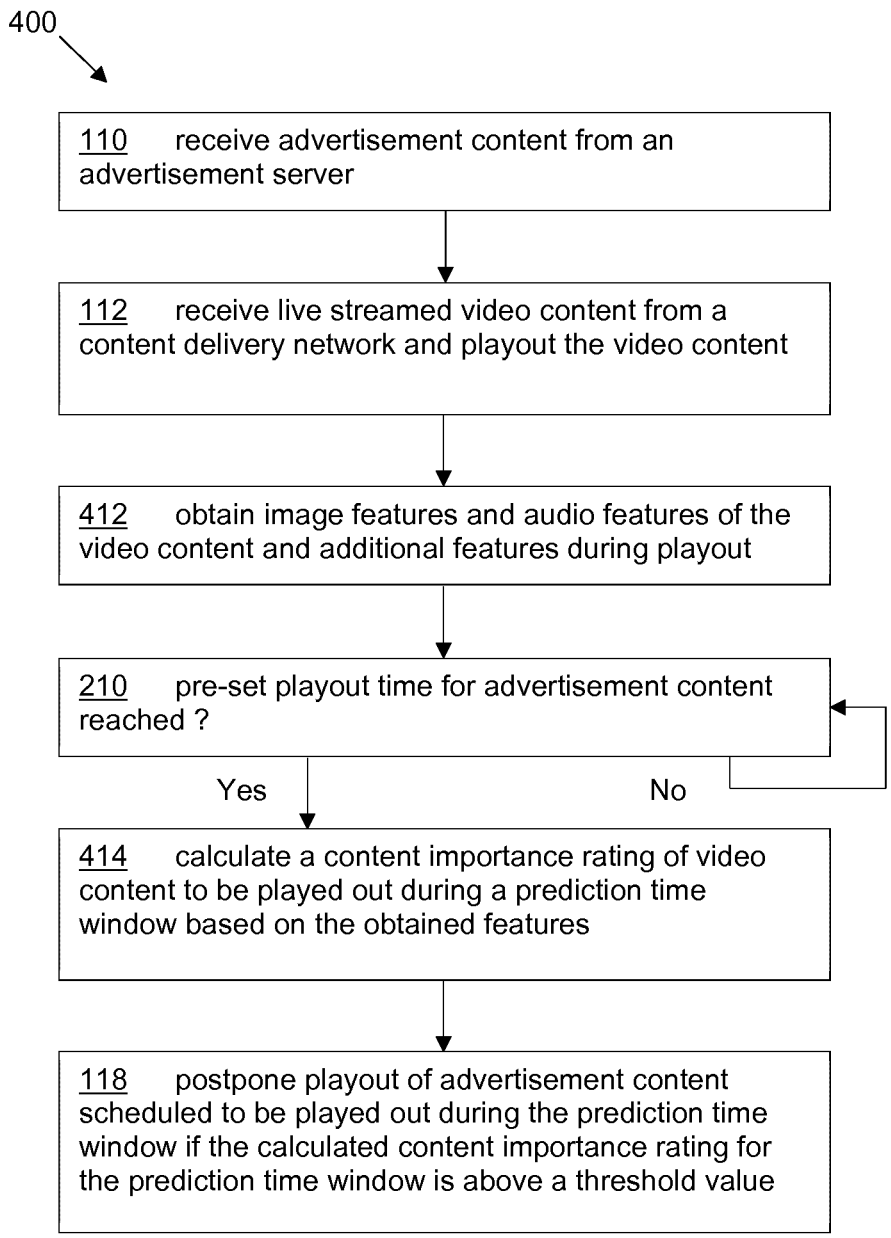

In the method 400 of the embodiment illustrated in FIG. 5, the content importance rating is additionally calculated based on one or more additional features. The additional features include features of the video content, such as a video frame rate, a video bit rate, a video contrast, a spatial complexity, a temporal complexity and a sound level, features of the end-user terminal, such as proximity of a user to the end-user terminal, number of running applications on the end-user terminal, and a current time of day.

The method 400 comprises obtaining at least one additional feature 412, in addition to obtaining image features and audio features of the video content, and calculating 414 a content importance rating based on all the obtained features.

Figure 6:
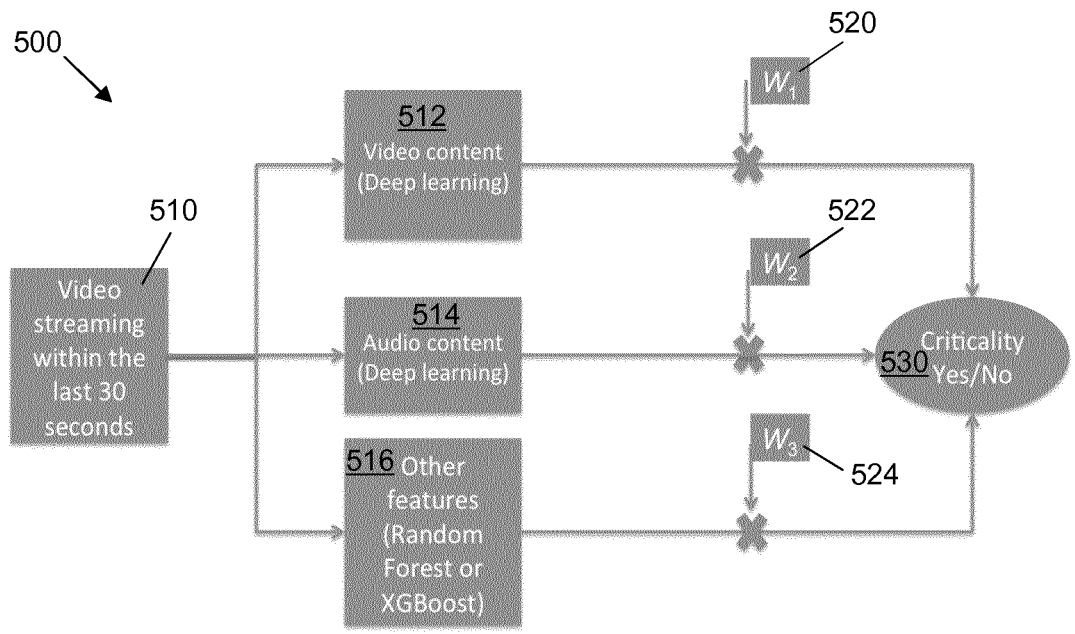

FIG. 6 illustrates steps 500 of a method of controlling playout of advertisement content during live video streaming at an end-user terminal, according to an embodiment of the invention.

In this embodiment, the method comprises obtaining image features and audio features of the video content and additional features of the video content and the end-user terminal during the previous 30 s of video streaming.

Calculating a content importance rating of video content to be played out during a prediction time window comprises:

determining 512 a first criticality probability of the image features and applying a first weight 520 to first criticality probability;

determining 514 a second criticality probability of the audio features and applying a second weight 522 to the second criticality probability;

determining 516 a third criticality probability of the additional features and applying a third weight 524 to the third criticality probability;

and summing the first, second and third weighted criticality probabilities.

The content importance rating is compared to a threshold value to determine 530 a binary rating, Yes/No. Playout of advertisement content scheduled to be played out during the prediction time window is postponed if the calculated content importance rating for the prediction time window is a 'Yes'.

Figure 7:
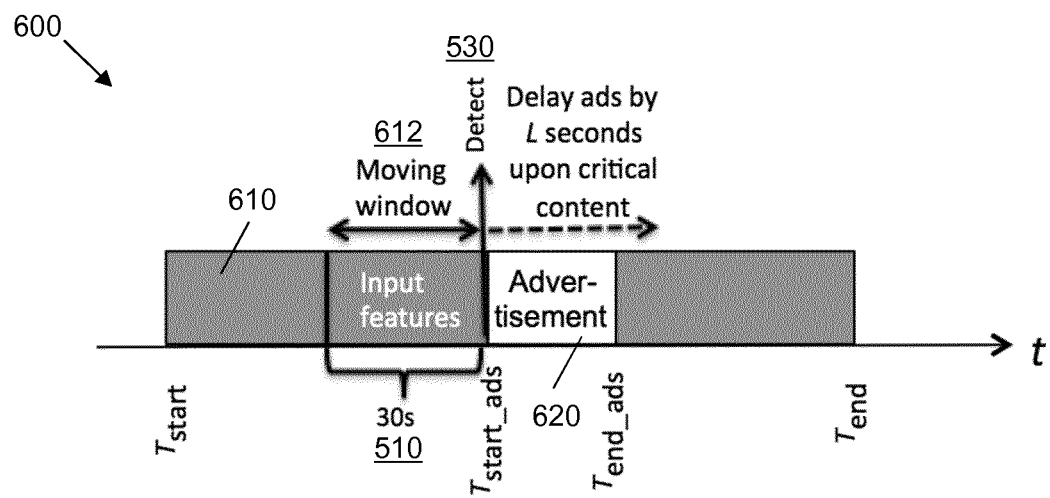

FIG. 7 illustrates a method 600 of controlling playout of advertisement content during live video streaming at an end-user terminal, according to an embodiment of the invention.

The image features, audio features and additional features are obtained from video content 610 within a 30 s long measurement time window 510. The prediction time 620 window follows the measurement time window, and the measurement and prediction time windows are rolling time windows.

A content importance rating is calculated for the measurement window in the manner illustrated in FIG. 6. Playout of advertisement content scheduled to be played out during the prediction time window 620 is postponed by L seconds if the calculated content importance rating for the prediction time window is a 'Yes'.

In an embodiment, image features and audio features are obtained and a content importance rating calculated as follows.

If, for instance, the video content includes people having a conversation, the content importance rating can be mainly based on changes in the audio frequency, including detection of who is talking importance detection based on the volume of the person, and detection of a question being asked by a person. This enables the advertisement content to be relocated from its originally planned location as the audience might be interested in hearing the answer to the question, which makes the content critical to the user.

With the help of sentiment analysis, the audio features of a person speaking and the speaker's attitude towards a particular topic as being positive or negative can be identified. If there are multiple people in the same scene, and if the attitudes continuously alter between positive and negative that are mapped to different human sound, then the content of the video can be identified as an important discussion. In addition, the volume of each speaker also helps to detect whether two people are arguing.

Numerous context/content/activity detection/awareness algorithms from sound, video and other sensor data are also known, as reported in Cavallaro et al "*Semantic video analysis for adaptive content delivery and automatic description*" IEEE Transactions On Circuits and Systems for Video Technology, Vol. 15, No. 10, October 2005, which enable sentiment analysis of the audio features.

Deep learning algorithms such as Long-short Term Memory, LSTM, algorithms enable powerful and accurate future sequence predictions from a given input sequence, and can map many sequences in the past to many sequences in the future.

Image features may, for example, be obtained during streaming of a live soccer match, and the calculation of a content importance rating can include detection of the speed and the location of the ball in the soccer field. For example, if the ball is within the penalty zone, an advertisement can be delayed. This can be performed using, for example, the Google Cloud Video Intelligence API that identifies what is in the image during a video stream.

The features that support the calculation of the content importance rating are as follows. The overall statistics (average, mean, median, standard deviation, skewness, kurtosis) of the following features measured within the last 30 seconds of video stream, as shown in FIG. 7:

Video content: The video content is processed as follows: Video content (image)→identify objects (who/what/where is in the video)→criticality (Boolean)

Identify objects: In case of sports event, detect the distance between the ball and the goal, detect the score of the match. In the case of news, detect who/what are in the screen and detect if the person/object is important.

Audio content: Audio content is analysed using well-known Mel-frequency cestrum coefficients, MFCC. Mel-frequency cestrum, MFC, represents the power spectrum of a sound, and it consists of MFC coefficients. It is typically used in audio similarity and music information retrieval. The audio content is processed as follows: Audio content→Audio features→Phonemes→words→sentiment analysis→criticality (Boolean)

Other features: Video frame rate, video bitrate, proximity of the user to the end-user terminal, number of running apps, hour of the day, video contrast, spatial complexity, temporal complexity, sound level.

Using these features, the machine learning model 500 detects 530 whether the content is critical or not, i.e., a binary classification problem. The prediction is done via end-to-end machine learning using the above features, with three different models, as shown in FIG. 6. A criticality probability 512, 514, 516 is calculated for each of video/image content, audio content and additional content by the three models. The criticality probabilities are multiplied by respective weights W1, W2, and W3, and summed to obtain the overall importance content rating.

During playout of live streaming video content, if an advertisement marker is reached, the machine learning model will make a decision to either postpone or display the advertisement content. The method is therefore event based, in response to an advertisement marker being reached, rather than being performed periodically.

Figure 8:
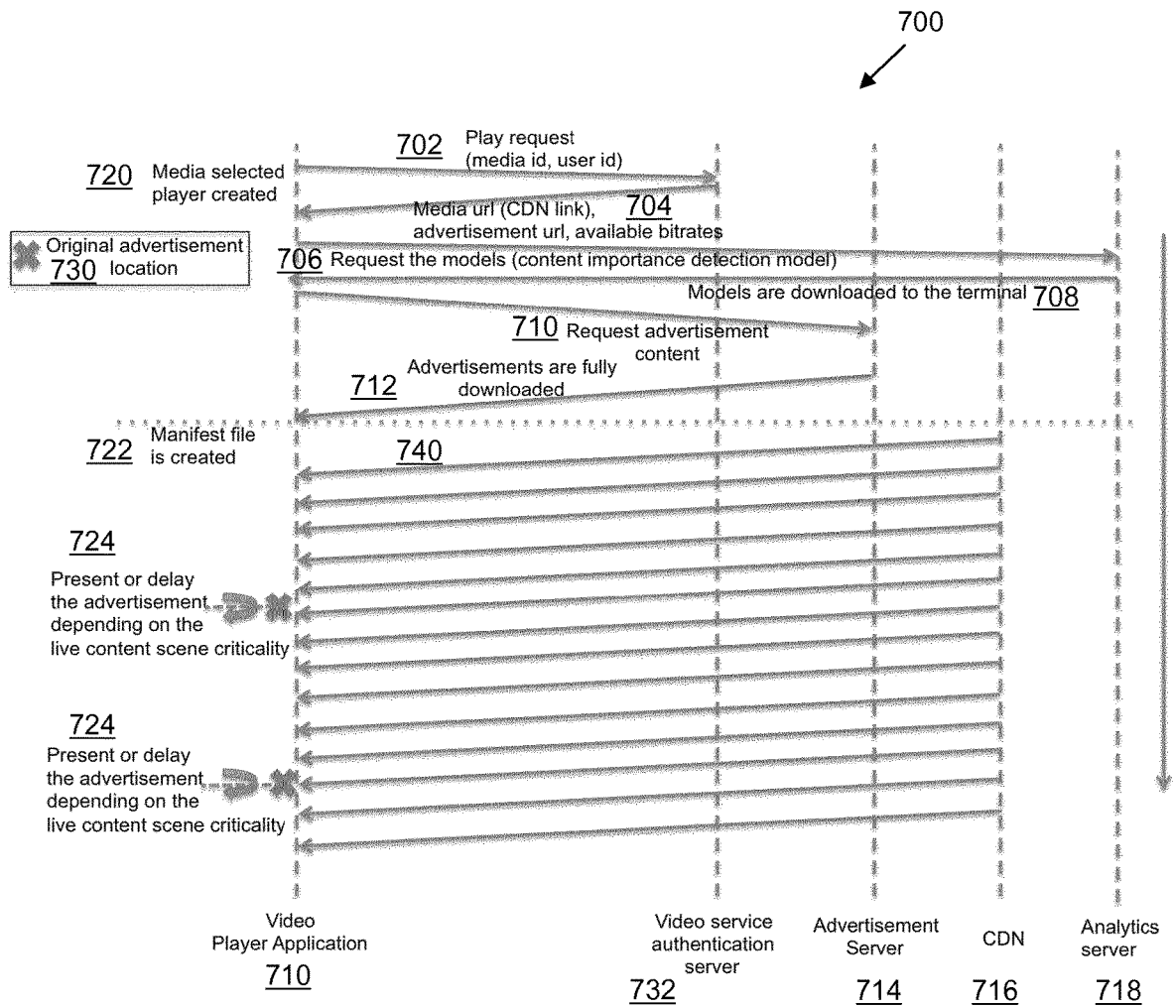

FIG. 8 illustrates signalling 700 between various nodes in a cloud server implementation of a method of controlling playout of advertisement content 632 during live video streaming on an end-user terminal.

The end-user terminal comprises a video player application 710.

The method comprises creating 720 a media selected player, i.e. the video player application 710 and sending a play request 702 to a video service authentication server 732, which sends back a media url (CDN link), advertisement content url, and available bitrates 704. The video player application then sends a request 706 to an analytics server 718 for the machine-learning model for calculating a content importance rating and deciding whether to play or postpone advertisement content. The machine-learning models are then downloaded 708 to the video player 710.

The video player sends a request 710 for advertisement content to an advertisement server 714, and advertisement content is downloaded 712 to the video player. A manifest file is created 722 containing the received advertisement content, including advertisement playout markers.

Video content 740 is then downloaded from a content delivery network, CDN, 716, to the video player. The video content is then played out by the video player and the video player obtains image features and audio features of the video content within a rolling 30 s measurement window 612, as shown in FIG. 7

When an advertisement marker 730, indicating a pre-set playout time for advertisement content, is reached, the video player decides whether to play the advertisement content associated with the marker (if a calculated content importance rating is below a threshold value) or to postpone playout of the advertisement content (if a calculated content importance rating is above a threshold value).

The process of receiving 740 video content obtaining image features and audio features within a 30 s rolling measurement window, and calculating 724 a content importance rating is repeated for the duration of the live streaming session.

Corresponding embodiments apply to the end-user terminals 800, 900 described below.

Figure 9:
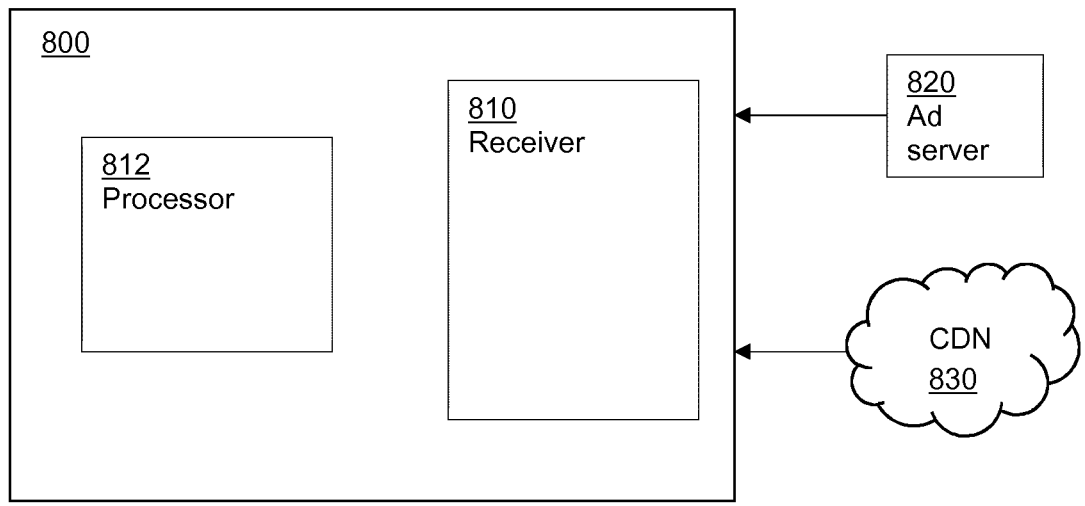
FIGS. 9 and 10 are schematic representations of end-user terminals according to embodiments of the invention.

Referring to FIG. 9, an embodiment of the invention provides an end-user terminal 800 arranged to control playout of advertisement content during live video streaming. The end-user terminal comprises a receiver 810 and a processor 812;

The receiver 810 is arranged to receive advertisement content from an advertisement server 820 and to receive live streamed video content from a content delivery network 830. The receiver is also arranged to play out the received video content and advertisement content.

The processor 812 arranged to obtain at least one of image features and audio features of the video content during playout. The processor further arranged to calculate a content importance rating of video content to be played out during a prediction time window based on said features. The processor is also arranged to postpone playout of advertisement content scheduled to be played out during the prediction time window if the calculated content importance rating for the prediction time window is above a threshold value.

In an embodiment, the processor 812 is arranged to determine, when a pre-set playout time for advertisement content is reached, whether the video content to be played out during a prediction time window following the pre-set playout time has a content importance rating above the threshold value. The processor is further arranged to postpone playout of advertisement content if the video content to be played out during said prediction time window has a content importance rating that is above the threshold value.

In an embodiment, the processor 812 is arranged to obtain image features by identifying objects within the video content. The processor is also arranged to obtain audio features by obtaining representations of power spectra of sounds within the video content.

In an embodiment, the processor 812 is arranged to obtain additional features comprising at least one of a video frame rate, a video bit rate, a video contrast, a spatial complexity, a temporal complexity, a sound level, proximity of a user to the end-user terminal, number of running applications on the end-user terminal, and a current time of day. The processor is arranged to calculate the content importance rating based on the image features, the audio features and the additional features.

In an embodiment, the processor 812 is arranged to predict the content importance rating by: determining a first criticality probability of the image features and applying a first weight to first criticality probability; determining second criticality probability of the audio features and applying a second weight to the second criticality probability; determining a third criticality probability of the additional features and applying a third weight to the third criticality probability; and summing the first, second and third weighted probabilities.

In an embodiment, the processor 812 is arranged to obtain the image features, audio features and additional features from video content within a measurement time window. The processor is arranged to predict a content importance rating of video content to be played out during a prediction time window following the measurement time window. The measurement and prediction time windows are rolling time windows.

Figure 10:
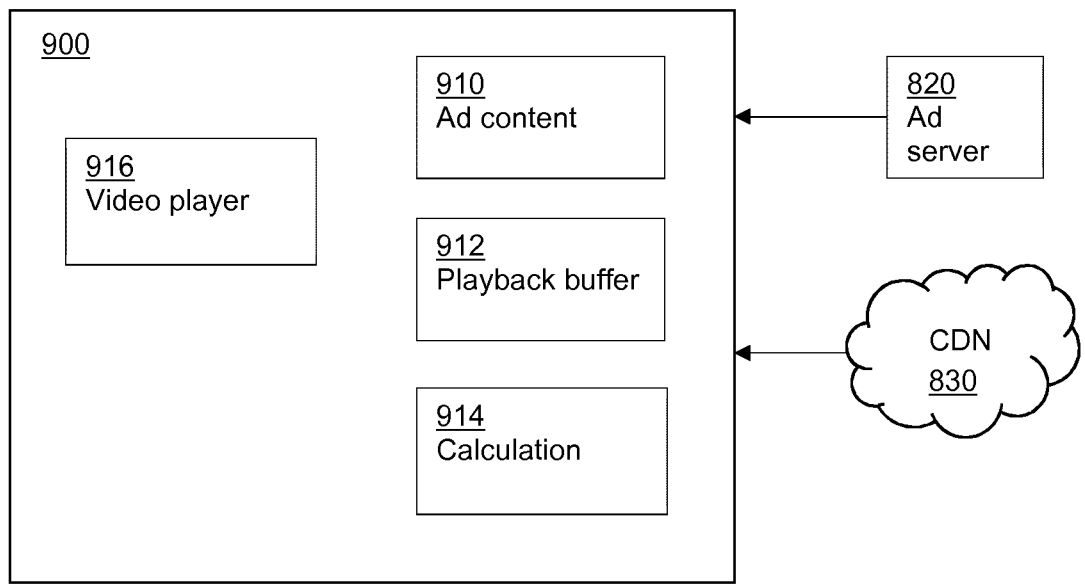

Referring to FIG. 10, an embodiment of the invention provides an end-user terminal 900 arranged to control playout of advertisement content during live video streaming. The end-user terminal comprises advertisement content processing circuitry 910, playback buffer processing circuitry 912, video player processing circuitry 916 and calculation processing circuitry 914.

The advertisement content processing circuitry is arranged to receive advertisement content from an advertisement server 820. The playback buffer processing circuitry arranged to receive video content from a content delivery network, CDN, 830. The video player processing circuitry arranged to playout video content from the playback buffer and to playout advertisement content from the advertisement content processing circuitry. The video player is arranged to obtain at least one of image features and audio features of the video content during playout. The calculation processing circuitry arranged to calculate a content importance rating of video content to be played out during a prediction time window based on said features. The video player processing circuitry is arranged to postpone playout of advertisement content scheduled to be played out during the prediction time window if the calculated content importance rating for the prediction time window is above a threshold value.

An embodiment of the invention provides a computer program, comprising instructions which, when executed on at least one processor, cause the at least one processor to carry out any of the above steps of the method of controlling playout of advertisement content during live video streaming at an end-user terminal.

An embodiment of the invention provides a data carrier having computer readable instructions embodied therein. The said computer readable instructions are for providing access to resources available on a processor. The computer readable instructions comprise instructions to cause the processor to perform any of the above steps of the method of controlling playout of advertisement content during live video streaming at an end-user terminal.

In an embodiment, the data carrier is a non-transitory data carrier.

The invention claimed is:

1. A method of controlling playout of advertisement content during live video streaming at an end-user terminal, the method comprising:
   receiving advertisement content from an advertisement server;
   receiving live streamed video content from a content delivery network and playing out the video content;
   obtaining at least one of image features and audio features of the received video content during playout;
   calculating a content importance rating of received video content to be played out during a prediction time window when a pre-set playout time for received advertisement content is reached, the prediction time window following the pre-set playout time; and
   postponing playout of the received advertisement content scheduled to be played out during the prediction time window if the calculated content importance rating of received video content to be played out during the prediction time window is above a threshold value.

2. The method as claimed in claim 1, further comprising at least one of obtaining image features by identifying objects within the video content, and obtaining audio features by obtaining representations of power spectra of sounds within the received video content.

3. The method as claimed in claim 1, further comprising:
   obtaining additional features comprising at least one of a video frame rate, a video bit rate, a video contrast, a spatial complexity, a temporal complexity, a sound level, proximity of a user to the end-user terminal, number of running applications on the end-user terminal, and a current time of day; and
   calculating the content importance rating of received video content based additionally on the obtained additional features.

4. The method as claimed in claim 3, wherein calculating the content importance rating of video content to be played out comprises:
    determining a first criticality probability of the obtained image features and applying a first weight to the first criticality probability;
    determining second criticality probability of the obtained audio features and applying a second weight to the second criticality probability;
    determining a third criticality probability of the additional features and applying a third weight to the third criticality probability; and
    summing the weighted first, second and third probabilities.

5. The method as claimed in claim 1, further comprising obtaining the image features, audio features and additional features from received video content within a measurement time window, wherein the prediction time window follows the measurement time window, and wherein the measurement and prediction time windows are rolling time windows.

6. An end-user terminal arranged to control playout of advertisement content during live video streaming, the end-user terminal comprising a receiver, a processor and a memory containing instructions executable by the processor thereby to configure the processor:
    to receive, via the receiver, advertisement content from an advertisement server and live streamed video content from a content delivery network to obtain at least one of image features and audio features of the received video content during playout;
    to calculate, when a pre-set playout time for the received advertisement content is reached, a content importance rating of received video content to be played out during a prediction time window, the prediction time window following the pre-set playout time; and
    to postpone playout of received advertisement content scheduled to be played out during the prediction time window if the calculated content importance rating of received video content to be played out during the prediction time window is above a threshold value.

7. The end-user terminal as claimed in claim 6, wherein the processor is thereby further configured to obtain at least one of image features by identifying objects within the received video content and audio features by obtaining representations of power spectra of sounds within the received video content.

8. The end-user terminal as claimed in claim 6, wherein the processor is thereby further configured:
    to obtain additional features comprising at least one of a video frame rate, a video bit rate, a video contrast, a spatial complexity, a temporal complexity, a sound level, proximity of a user to the end-user terminal, number of running applications on the end-user terminal, and a current time of day; and
    to calculate the content importance rating of received video content based additionally on the obtained additional features.

9. The end-user terminal as claimed in claim 8, wherein the processor is thereby further configured:
    to predict the content importance rating by:
    determining a first criticality probability of the obtained image features and applying a first weight to the first criticality probability;
    determining a second criticality probability of the obtained audio features and applying a second weight to the second criticality probability;
    determining a third criticality probability of the additional features and applying a third weight to the third criticality probability; and
    summing the weighted first, second and third criticality probabilities.

10. The end-user terminal as claimed in claim 6, wherein the processor is thereby further configured to obtain the image features, audio features and additional features from received video content within a measurement time window and the processor is arranged to predict a content importance rating of received video content to be played out during a prediction time window following the measurement time window, and wherein the measurement and prediction time windows are rolling time windows.

11. An end-user terminal comprising:
    advertisement content processing circuitry arranged to receive advertisement content from an advertisement server;
    a playback buffer processing circuitry arranged to receive video content from a content delivery network;
    video player processing circuitry arranged to playout video content from the playback buffer and advertisement content from the advertisement content processing circuitry, and arranged to obtain at least one of image features and audio features of the video content during playout; and
    calculation processing circuitry arranged to calculate a content importance rating of video content to be played out during a prediction time window when a pre-set playout time for received advertisement content is reached, the prediction time window following the pre-set playout time, and
    wherein the video player processing circuitry is arranged to postpone playout of advertisement content scheduled to be played out during the prediction time window if the calculated content importance rating of video content to be played out during the prediction time window is above a threshold value.

12. A non-transitory computer-readable storage medium having stored therein a computer program which when loaded into a processor and executed, causes the processor to implement the method according to claim 1.

* * * * *